(12) United States Patent
Chen et al.

(10) Patent No.: US 10,936,121 B2
(45) Date of Patent: Mar. 2, 2021

(54) METHOD AND DEVICE FOR CONTROLLING IN-PLANE INTERFERENCE OF LIQUID CRYSTAL TOUCH SCREEN, AND DISPLAY SYSTEM

(71) Applicant: SHENZHEN CHINA STAR OPTOELECTRONICS TECHNOLOGY CO., LTD., Guangdong (CN)

(72) Inventors: Lei Chen, Shenzhen (CN); Yuhua Chang, Shenzhen (CN); Ming-wei Chen, Shenzhen (CN); Huiyang Kang, Shenzhen (CN); Wendong Li, Shenzhen (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 35 days.

(21) Appl. No.: 16/096,112

(22) PCT Filed: Aug. 1, 2018

(86) PCT No.: PCT/CN2018/097843
§ 371 (c)(1),
(2) Date: Oct. 24, 2018

(87) PCT Pub. No.: WO2019/210592
PCT Pub. Date: Nov. 7, 2019

(65) Prior Publication Data
US 2019/0339812 A1    Nov. 7, 2019

(51) Int. Cl.
*G06F 3/041* (2006.01)
*G09G 3/36* (2006.01)

(52) U.S. Cl.
CPC ......... *G06F 3/0418* (2013.01); *G09G 3/3614* (2013.01)

(58) Field of Classification Search
CPC ............ G09G 3/3614; G09G 2320/02; G09G 2320/0247; G09G 2320/0285
See application file for complete search history.

(56) References Cited

U.S. PATENT DOCUMENTS

| | | | |
|---|---|---|---|
| 2006/0279506 A1* | 12/2006 | Choi | G09G 3/3614 345/98 |
| 2013/0069894 A1* | 3/2013 | Chen | G06F 3/0412 345/173 |
| 2019/0073969 A1 | 3/2019 | Li et al. | |

FOREIGN PATENT DOCUMENTS

| | | | | |
|---|---|---|---|---|
| CN | 106340279 A | 1/2017 | | |
| CN | 106847213 A | 6/2017 | | |
| CN | 106847213 A * | 6/2017 | | G09G 3/36 |

* cited by examiner

*Primary Examiner* — Yuzhen Shen
(74) *Attorney, Agent, or Firm* — Mark M. Friedman (57) ABSTRACT

A method and device for controlling in-plane interference of a liquid crystal touch screen and a display system are provided. By detecting a current image of a display panel of the liquid crystal touch screen in real time, and when the image that causes the in-plane interference of the liquid crystal touch screen is detected, inverting original polarities of data voltages input to at least a portion of data lines of the display panel, so that change directions of coupled voltages of adjacent two of the data lines with respect to a common electrode are opposite to each other, solving problems of in-plane interference for the liquid crystal touch screen.

4 Claims, 5 Drawing Sheets

METHOD AND DEVICE FOR CONTROLLING IN-PLANE INTERFERENCE OF LIQUID CRYSTAL TOUCH SCREEN, AND DISPLAY SYSTEM

FIELD OF INVENTION

The present disclosure relates to a field of display technology, and more particularly to a method and device for controlling in-plane interference of a liquid crystal touch screen and a display system.

BACKGROUND OF INVENTION

With development of touch technology, consumers are increasingly demanding more from large size capacitive touch screen technology. Liquid crystal touch screens are formed by combining liquid crystal displays (LCDs) and touch screens. Touch screens (TPs) are formed by two conductive electrode plates, one being a driving electrode (TX) and the other being a receiving electrode (RX). TXs drive at a particular frequency, and RXs scan at a particular frequency.

Figure 1:
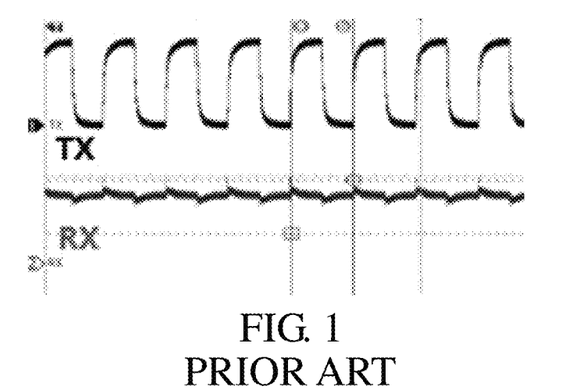
FIG. 1 is a schematic diagram of ripples generated during particular images by existing liquid crystal touch screens.

However, when LCDs display different images, liquid crystals are flipped in different flipping manners. During some particular images, data lines cause a large amount of rippling of touch screens, resulting in interference to touch screens. Because the loads of LCDs and touch screens for large size capacitive touch screens increase, rippling of touch screens are larger, and touch screens are prone to have explosion point errors. It has been verified that, when a driving manner, such as Dot V Strip, V Strip by One Pixel, V 1+2 line, V Strip by Sub-pixel, or H 1+2 Line Flicker, is used, as illustrated in FIG. 1, display panels (patterns) generate enormous ripples that interfere with touch screens, leading to problems, such as explosion point failures of touch screens, and touch failures.

Therefore, it is desired to provide a method and device for controlling in-plane interference of a liquid crystal touch screen to solve existing problems in the related art.

SUMMARY OF INVENTION

The present disclosure provides a method and device for controlling in-plane interference of a liquid crystal touch screen and a display system, which eliminate ripple interference from sources, and enable touch screens to normally operate for any image, thereby solving problems that liquid crystal modules (LCMs) interfere with touch screens in-plane.

In order to solve foregoing problems, the present disclosure provides the following solution.

The present disclosure provides a method for controlling in-plane interference of a liquid crystal touch screen. The liquid crystal touch screen includes a display panel and a touch screen. The method includes:

(S1) using a timing controller to detect a current image displayed by the display panel, and obtaining characteristic parameters of the current image;

(S2) matching the characteristic parameters to data in a predetermined characteristic parameter table, and if the characteristic parameters are same as the data in the predetermined characteristic parameter table, obtaining adjustment parameters corresponding to the data in the predetermined characteristic parameter table by the timing controller; and (S3) inverting original polarities of data voltages input to at least a portion of data lines of the display panel based on the adjustment parameters, so that change directions of coupled voltages of adjacent two of the data lines with respect to a common electrode are opposite to each other.

In accordance with a preferred embodiment of the present disclosure, before the step S1, the method further includes:

(S101) obtaining predetermined characteristic parameters of the display panel, wherein the display panel generates ripple interference to the touch screen;

(S102) creating the predetermined characteristic parameter table in a storage device of the timing controller; and (S103) creating, in the storage device of the timing controller, an adjustment parameter table corresponding to the data in the predetermined characteristic parameter table.

In accordance with a preferred embodiment of the present disclosure, data of the characteristic parameters and the data in the predetermined characteristic parameter table are polarities of data signals of the display panel.

In accordance with a preferred embodiment of the present disclosure, when the characteristic parameters of the current image matched to the data in the predetermined characteristic parameter table are polarities of "+−+−", adjusting the image to be displayed in an inverted polarity manner of "++−−" using the adjustment parameters, where "+" denotes a positive polarity, and "−" denotes a negative polarity.

In accordance with a preferred embodiment of the present disclosure, the display panel includes n number of gate lines and m number of the data lines, wherein any column of sub-pixels is connected to adjacent two of the data lines in the m number of the data lines, and the column of sub-pixels are alternately connected to the two data lines;

a same row of sub-pixels are all connected to one of the gate lines in the n number of the gate lines, each sub-pixel of the same row of sub-pixels is located on a same side of each of them number of the data lines, and each adjacent two rows of sub-pixels are correspondingly connected to two sides of each of the m number of the data lines; and a change direction of a coupled voltage of an $m1^{th}$ data line of the data lines with respect to the common electrode and a change direction of a coupled voltage of an $m2^{th}$ data line of the data lines with respect to the common electrode are opposite to each other, wherein m1 is an odd number and m2 is an even number.

The present disclosure further provides a device for controlling in-plane interference of a liquid crystal touch screen. The liquid crystal touch screen includes a display panel and a touch screen. The device includes:

a detecting module configured to detect a current image displayed by the display panel in real time, and obtain characteristic parameters of the current image;

a matching module configured to receive the characteristic parameters detected by the detecting module, and match the characteristic parameters to data in a predetermined characteristic parameter table;

an obtaining module configured to, based on matching information of the matching module, if the characteristic parameters are same as the data in the predetermined characteristic parameter table, obtain adjustment parameters corresponding to the data in the predetermined characteristic parameter table; and an inverting module configured to receive the adjustment parameters, and invert original polarities of data voltages input to at least a portion of data lines of the display panel based on the adjustment parameters, so that change directions of coupled voltages of adjacent two of the data lines with respect to a common electrode are opposite to each other.

In accordance with a preferred embodiment of the present disclosure, the detecting module includes:

a first sub-detecting module configured to detect predetermined characteristic parameters of the display panel, wherein the display panel generates ripple interference to the touch screen; and a second sub-detecting module configured to detect the characteristic parameters of the current image of the display panel.

In accordance with a preferred embodiment of the present disclosure, the matching module includes:

a first sub-storing module configured to store the predetermined characteristic parameter table in a storage device of the timing controller;

a second sub-storing module configured to store, in the storage device of the timing controller, an adjustment parameter table corresponding to the data in the predetermined characteristic parameter table; and a sub-matching module configured to match data of the characteristic parameters to the data in the predetermined characteristic parameter table.

In accordance with a preferred embodiment of the present disclosure, data of the characteristic parameters and the data in the predetermined characteristic parameter table are polarities of data signals of the display panel.

The present disclosure further provides a display system including a liquid crystal touch screen and a device for controlling in-plane interference of the liquid crystal touch screen. The device is connected to the liquid crystal touch screen, to control the in-plane interference of the liquid crystal touch screen. The device for controlling the in-plane interference of the liquid crystal touch screen includes:

a detecting module configured to detect a current image displayed by the display panel in real time, and obtain characteristic parameters of the current image;

a matching module configured to receive the characteristic parameters detected by the detecting module, and match the characteristic parameters to data in a predetermined characteristic parameter table;

an obtaining module configured to, based on matching information of the matching module, if the characteristic parameters are same as the data in the predetermined characteristic parameter table, obtain adjustment parameters corresponding to the data in the predetermined characteristic parameter table; and an inverting module configured to receive the adjustment parameters, and invert original polarities of data voltages input to at least a portion of data lines of the display panel based on the adjustment parameters, so that change directions of coupled voltages of adjacent two of the data lines with respect to a common electrode are opposite to each other.

In accordance with a preferred embodiment of the present disclosure, the detecting module includes:

a first sub-detecting module configured to detect predetermined characteristic parameters of the display panel, wherein the display panel generates ripple interference to the touch screen; and a second sub-detecting module configured to detect the characteristic parameters of the current image of the display panel.

In accordance with a preferred embodiment of the present disclosure, the matching module includes:

a first sub-storing module configured to store the predetermined characteristic parameter table in a storage device of the timing controller;

a second sub-storing module configured to store, in the storage device of the timing controller, an adjustment parameter table corresponding to the data in the predetermined characteristic parameter table; and a sub-matching module configured to match data of the characteristic parameters to the data in the predetermined characteristic parameter table.

In accordance with a preferred embodiment of the present disclosure, data of the characteristic parameters and the data in the predetermined characteristic parameter table are polarities of data signals of the display panel.

Advantages of the present disclosure are: compared to existing display systems, a method and device for controlling in-plane interference of a liquid crystal touch screen and a display system provided by the present disclosure, by using a timing controller to detect a large ripple image on a display panel of the liquid crystal touch screen, and by inverting original polarities of data voltages input to at least a portion of data lines of the display panel, so that change directions of coupled voltages of adjacent two of the data lines with respect to a common electrode are opposite to each other, couplings to a common voltage cancel each other, and rippling while polarities of the data lines are inverted is significantly reduced. Therefore, touch screens (TPs) of liquid crystal touch screens would not generate explosion points, thereby solving problems that LCMs interfere with touch screens in-plane.

DESCRIPTION OF DRAWINGS

In order to describe a technical solution in embodiments or existing technology more clearly, drawings required to be used by the embodiments or the existing technology are briefly introduced below. Obviously, the drawings in the description below are only some embodiments of the present disclosure. With respect to persons of ordinary skill in the art, under a premise that inventive efforts are not made, other drawings may be obtained based on these drawings.

FIGS. 3A-3C are schematic diagrams of voltage changes of coupled voltages of adjacent two of data lines in FIG. 3A in accordance with an embodiment of the present disclosure.

DETAILED DESCRIPTION OF PREFERRED EMBODIMENTS

The description of each embodiment below refers to respective accompanying drawing(s), so as to illustrate exemplarily specific embodiments of the present disclosure that may be practiced. Directional terms mentioned in the present disclosure, such as "upper", "lower", "front", "back", "left", "right", "inner", "outer", "side", etc., are only directions by referring to the accompanying drawings, and thus the used directional terms are used to describe and understand the present disclosure, but the present disclosure is not limited thereto. In the drawings, structurally similar units are labeled by the same reference numerals.

The present disclosure is directed to the technical problem that, for existing display systems, during some particular images, data lines cause a large amount of rippling of touch screens, resulting in interference to touch screens leading to explosion point failures of touch screens. The present embodiment can solve the deficiency.

Figure 2:
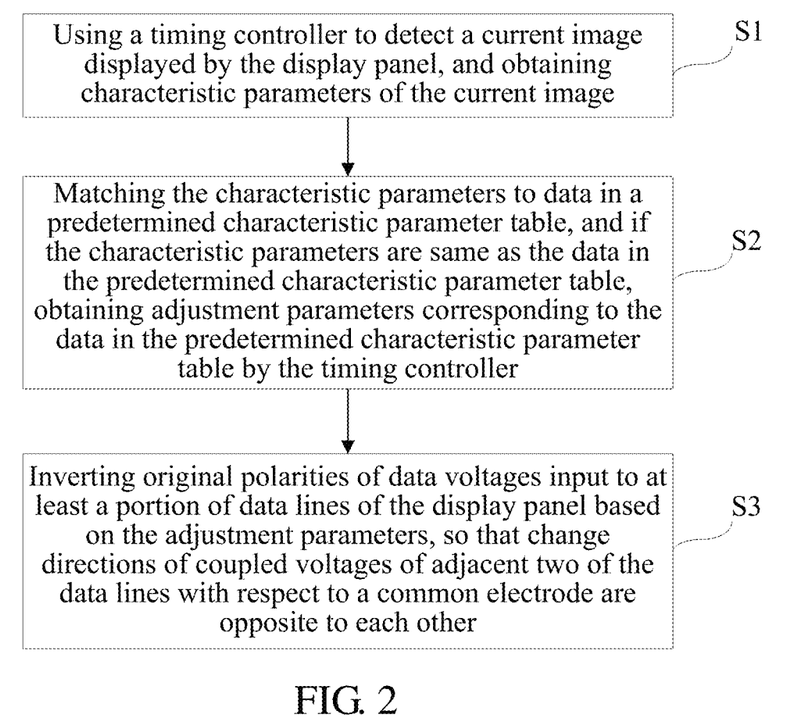
FIG. 2 is a flowchart of a method for controlling in-plane interference of a liquid crystal touch screen in accordance with the present disclosure.

FIG. 2 illustrates a flowchart of a method for controlling in-plane interference of a liquid crystal touch screen in accordance with the present disclosure. The liquid crystal touch screen includes a display panel and a touch screen. The method includes:

(S1) using a timing controller to detect a current image displayed by the display panel, and obtaining characteristic parameters of the current image;

(S2) matching the characteristic parameters to data in a predetermined characteristic parameter table, and if the characteristic parameters are same as the data in the predetermined characteristic parameter table, obtaining adjustment parameters corresponding to the data in the predetermined characteristic parameter table by the timing controller; and (S3) inverting original polarities of data voltages input to at least a portion of data lines of the display panel based on the adjustment parameters, so that change directions of coupled voltages of adjacent two of the data lines with respect to a common electrode are opposite to each other.

Change directions of a coupled voltage include a low voltage to a high voltage change direction and a high voltage to a low voltage change direction. A voltage change of the coupled voltage of the adjacent two of the data lines with respect to the common electrode results from corresponding voltage changes of the adjacent two of the data lines.

Specifically, before the step S1, a liquid crystal driving manner corresponding to the display panel is first found, wherein the display panel generates ripple interference to the touch screen, then characteristic information of a displayed image corresponding to the driving manner used is created in the timing controller, to create a reference model of the corresponding image of the display panel that generates the ripple interference to the touch screen. Specifically, the method further includes:

(S101) obtaining predetermined characteristic parameters of the display panel, wherein the display panel generates ripple interference to the touch screen;

(S102) creating the predetermined characteristic parameter table in a storage device of the timing controller; and (S103) creating, in the storage device of the timing controller, an adjustment parameter table corresponding to the data in the predetermined characteristic parameter table.

It has been verified that, when a driving manner, such as Dot V Strip, V Strip by One Pixel, V 1+2 line, V Strip by Sub-pixel, or H 1+2 Line Flicker, is used, display panels generate enormous ripples that interfere with touch screens, leading to explosion point failures of touch screens. Therefore, when the driving manner is used to drive liquid crystals, the predetermined characteristic parameters of the display panel are first collected. Preferably, the predetermined characteristic parameters are polarities of data signals of the display panel. Preferably, the predetermined controller is a timing controller. Thereafter, the predetermined characteristic parameter table is created in the storage device of the timing controller. The adjustment parameter table corresponding to the data in the predetermined characteristic parameter table is created in the storage device of the timing controller. The adjustment parameter table may be polarities of data signals of the display panel. Because the predetermined characteristic parameters (i.e. the polarities of the data signals for the corresponding image that causes in-plane interference) have been known when the model is created, the adjustment parameters may be known (i.e. the polarities of the data signals that cause change directions of coupled voltages of adjacent two of data lines with respect to a common electrode to be opposite to each other may be known) based on the predetermined characteristic parameters. The adjustment parameters are stored in the storage device, and may be accessed when necessary.

After the reference model for the ripple interference generated is created, controlling the in-plane interference of the liquid crystal touch screen begins. The timing controller is used to detect the current image displayed by the display panel, and the characteristic parameters of the current image are obtained. The characteristic parameters are preferably polarities of data lines of the display panel. The characteristic parameters are matched to the data in the predetermined characteristic parameter table, and if the characteristic parameters are same as the data in the predetermined characteristic parameter table, the adjustment parameters corresponding to the data in the predetermined characteristic parameter table are obtained by the timing controller. The original polarities of the data voltages input to the at least the portion of the data lines of the display panel are inverted based on the adjustment parameters, so that the change directions of the coupled voltages of the adjacent two of the data lines with respect to the common electrode are opposite to each other.

The present embodiment illustrates improvement effects using only DOT V strip as an example. When the characteristic parameters of the current image matched to the data in the predetermined characteristic parameter table are polarities of "+−+−", an image is adjusted to be displayed in an inverted polarity manner of "++" "++−−" using the adjustment parameters, where "+" denotes a positive polarity, and "−" denotes a negative polarity.

Figure 3A:
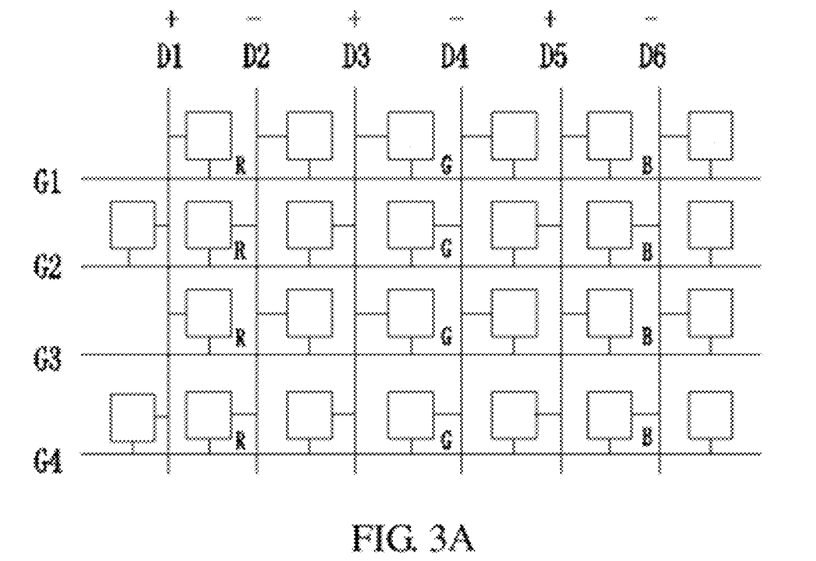
FIG. 3A is a schematic diagram of a driving manner of a display panel that generates ripple interference to a touch screen in accordance with an embodiment of the present disclosure.

Specifically, referring to FIG. 3A, the display panel includes n number of gate lines and m number of the data lines, wherein n and m are integers. Any column of sub-pixels is connected to adjacent two of the data lines in the m number of the data lines, and the column of sub-pixels are alternately connected to the two data lines. A same row of sub-pixels are all connected to one of the gate lines in the n number of the gate lines, each sub-pixel of the same row of sub-pixels is located on a same side of each of the m number of the data lines, and each adjacent two rows of sub-pixels is correspondingly connected to two sides of each of the m number of the data lines. In the figure, only n=4 and m=6 are used as an example for illustration.

Figure 3B:
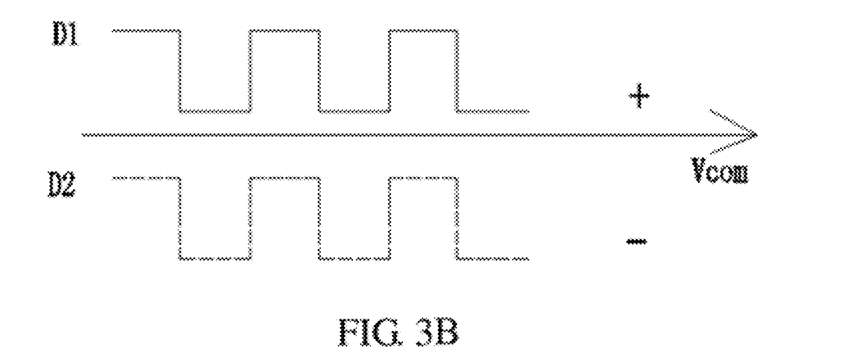
Figure 3C:
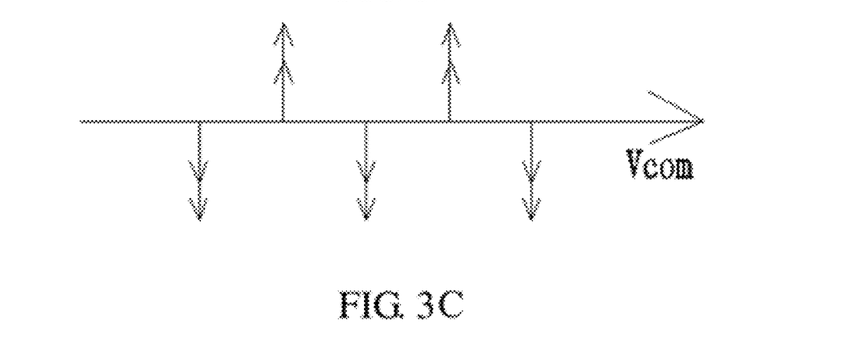
Figure 3D:
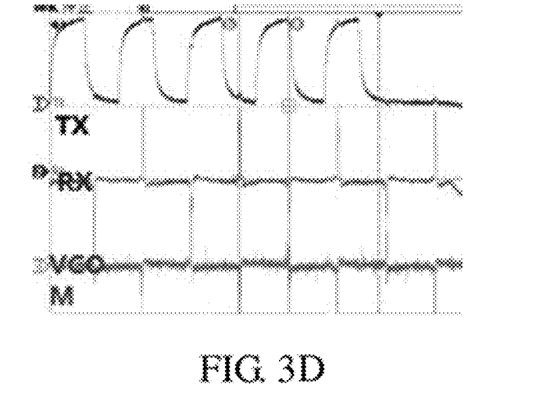
FIG. 3D is a schematic waveform diagram of TP+LCD TX and RX under the driving manner in FIG. 3A in accordance with an embodiment of the present disclosure.

When the display panel is displaying an image with polarities of "+−+−", an original polarity of a data voltage input to an $m1^{th}$ data line is positive, and an original polarity of a data voltage input to an $m2^{th}$ data line is negative, wherein m1 is an odd number and m2 is an even number. Taking a first data line D1 and a second data line D2 as an example, when the data line D1 is being driven using a positive polarity, a sub-pixel corresponding to a high voltage level phase is "bright," a column of sub-pixels connected to the data line D1 is correspondingly distributed in a "bright", "dark", "bright", and "dark" manner from a gate line G1 to a gate line G4. That is, a voltage on the data line D1 changes from high to low. When the data line D2 is being driven using a negative polarity, a sub-pixel corresponding to a low voltage level phase is "bright," a column of sub-pixels connected to the data line D2 is correspondingly distributed in a "dark", "bright", "dark", and "bright" manner from the gate line G1 to the gate line G4. That is, a voltage on the data line D2 changes from high to low. Voltage changes corresponding to the data line D1 and the data line D2 are illustrated in FIGS. 3B-3C. At a same time, both the data line D1 and the data line D2 change from a high voltage to a low voltage, and have same voltage change directions. Therefore, change directions of coupled voltages of the data line D1 and the data line D2 with respect to a common electrode are same. There is no phase difference between the data line D1 and the data line D2. At this time, the coupled voltages of the adjacent two of the data lines superpose each other, leading to severe interference to a common electrode voltage. The display panel generate enormous ripples that interfere with a touch screen. A schematic waveform diagram of TP+LCD TX and RX under this situation is illustrated in FIG. 3D. It can be seen that LCD interference to the touch screen is severe.

Figure 4A:
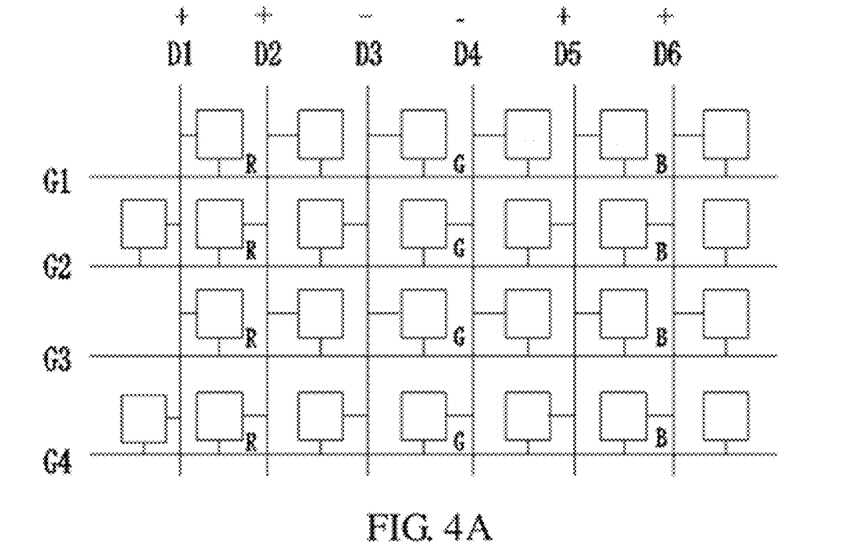
FIG. 4A is a schematic diagram of a driving manner of the display panel after polarities of a portion of the data lines are inverted in accordance with an embodiment of the present disclosure.
Figure 4B:
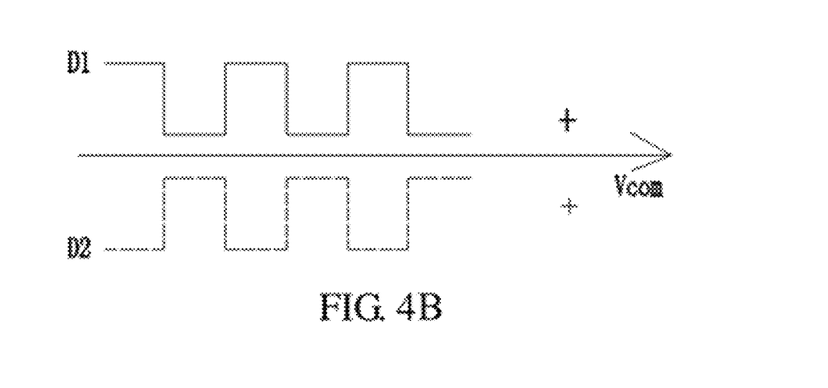
FIGS. 4B-4C are schematic diagrams of voltage changes of coupled voltages of the adjacent two of the data lines in FIG. 4A in accordance with an embodiment of the present disclosure.
Figure 4C:
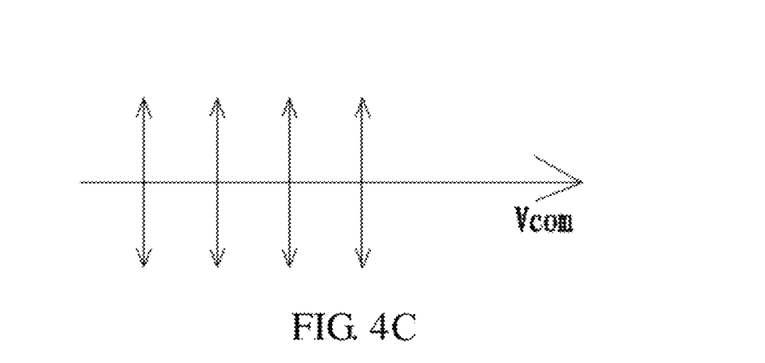
Figure 4D:
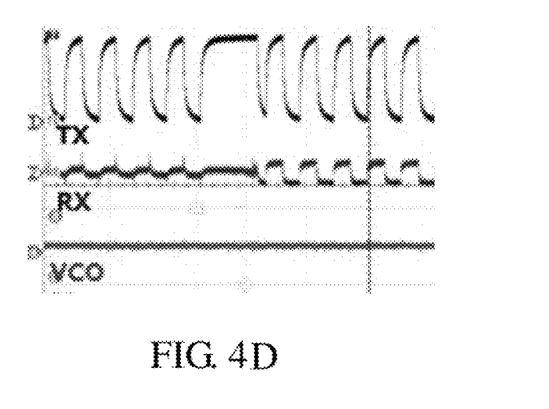
FIG. 4D is a schematic waveform diagram of TP+LCD TX and RX under the driving manner in FIG. 4A in accordance with an embodiment of the present disclosure.

At this time, if a solution of the present disclosure is used, the original polarity of the data voltage input to the corresponding data line is inverted. Therefore, this phenomenon is prevented. Specifically, referring to FIGS. 4A-4C, when the display panel displays an image with the above polarities, a Column inversion manner is changed into a 1+2 line inversion manner. That is, the above polarities are adjusted into polarities of "++−−." Similarly, in the figure, n=4 and m=6 are used as an example for illustration. Taking a first data line D1 and a second data line D2 as an example, when the data line D1 is being driven using a positive polarity, a column of sub-pixels connected to the data line D1 is correspondingly distributed in a "bright", "dark", "bright", and "dark" manner from a gate line G1 to a gate line G4. When the data line D2 is being driven using a positive polarity, a column of sub-pixels connected to the data line D2 is correspondingly distributed in a "bright", "dark", "bright", and "dark" manner from the gate line G1 to the gate line G4. Voltage changes corresponding to the data line D1 and the data line D2 are illustrated in FIGS. 4B-4C. At a same time, from the "bright" sub-pixel to the "dark" sub-pixel on the data line D1, a corresponding voltage change of the data line D1 is from a high voltage to a low voltage. From the "bright" sub-pixel to the "dark" sub-pixel on the data line D2, a corresponding voltage change of the data line D2 is from a low voltage to a high voltage. The same applies to data lines D3 and D4, etc. Because change directions of voltages of the adjacent two of the data lines are opposite to each other, change directions of coupled voltages of the adjacent two of the data lines with respect to a common electrode are opposite to each other. There is phase difference between the data line D1 and the data line D2. At this time, the coupled voltages of the adjacent two of the data lines cancel each other, thereby alleviating interference to a common electrode voltage. Therefore, ripple interference is eliminated from a source, and a touch screen is enabled to normally operate for the particular image. A schematic waveform diagram of TP+LCD TX and RX after improvement is illustrated in FIG. 4d. It can be seen that the problem of LCD interference to the touch screen is well solved.

Figure 5:
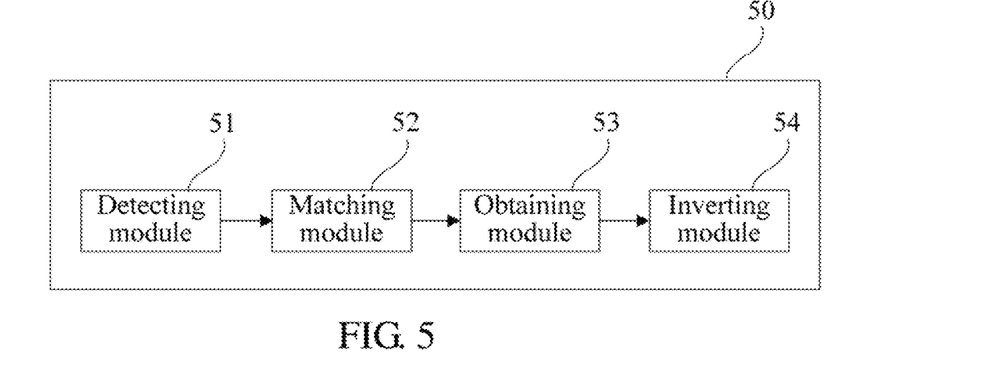
FIG. 5 is a schematic diagram of a device for controlling in-plane interference of a liquid crystal touch screen in accordance with the present disclosure.

The present disclosure further provides a device for controlling in-plane interference of a liquid crystal touch screen. The liquid crystal touch screen includes a display panel and a touch screen. As illustrated in FIG. 5, the device 50 includes a detecting module 51, a matching module 52, an obtaining module 53, and an inverting module 54.

First, in the device 50, a reference model of a corresponding image of the display panel is created, wherein the display panel generates ripple interference to the touch screen. The following steps are specifically included: obtaining predetermined characteristic parameters of the display panel, wherein the display panel generates ripple interference to the touch screen; creating the predetermined characteristic parameter table in a storage device of a timing controller; and creating, in the storage device of the timing controller, an adjustment parameter table corresponding to the data in the predetermined characteristic parameter table. Data in the predetermined characteristic parameter table and data in the adjustment parameter table are preferably polarity information of data signals of the display panel. After the reference model for the ripple interference generated is created, the device 50 begins to control the in-plane interference of the liquid crystal touch screen.

Figure 6:
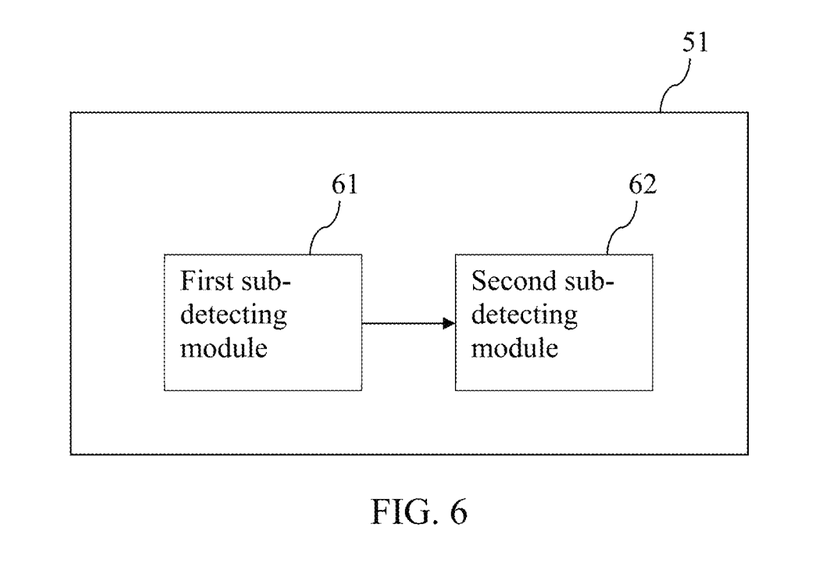
FIG. 6 is a schematic diagram of a detecting module of the device for controlling the in-plane interference of the liquid crystal touch screen in accordance with the present disclosure.

The detecting module 51 is configured to detect a current image displayed by the display panel in real time, and obtain characteristic parameters of the current image. The characteristic parameters are preferably polarity parameters of data signals of the display panel. Referring to FIG. 6, the detecting module 51 includes a first sub-detecting module 61 configured to detect the predetermined characteristic parameters of the display panel, wherein the display panel generates ripple interference to the touch screen, to create the model; and a second sub-detecting module 62 configured to detect the characteristic parameters of the current image of the display panel.

Figure 7:
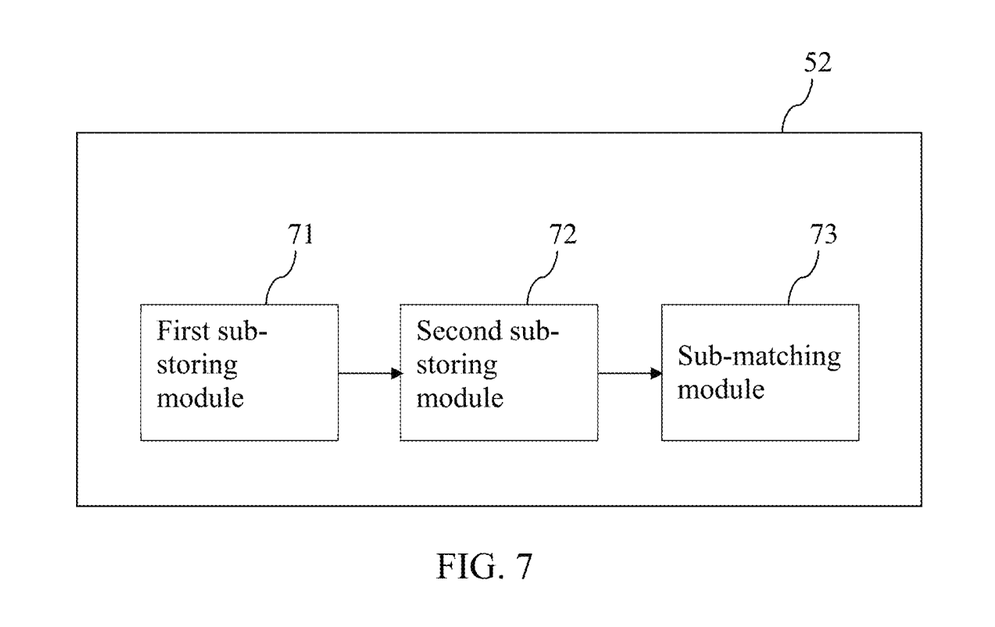
FIG. 7 is a schematic diagram of a matching module of the device for controlling the in-plane interference of the liquid crystal touch screen in accordance with the present disclosure.

The matching module 52 is configured to receive the characteristic parameters detected by the detecting module 51, and match the characteristic parameters to the data in the predetermined characteristic parameter table. Referring to FIG. 7, the matching module 52 includes: a first sub-storing module 71 configured to store the predetermined characteristic parameter table in the storage device of the timing controller; a second sub-storing module 72 configured to store, in the storage device of the timing controller, the adjustment parameter table corresponding to the data in the predetermined characteristic parameter table; and a sub-matching module 73 configured to match data of the characteristic parameters to the data in the predetermined characteristic parameter table.

The obtaining module 53 is configured to, based on matching information of the matching module, if the characteristic parameters are same as the data in the predetermined characteristic parameter table, obtain adjustment parameters corresponding to the data in the predetermined characteristic parameter table.

The inverting module 54 is configured to receive the adjustment parameters, and invert original polarities of data voltages input to at least a portion of data lines of the display panel based on the adjustment parameters, so that change directions of coupled voltages of adjacent two of the data lines with respect to a common electrode are opposite to each other.

The present embodiment illustrates improvement effects using DOT V strip as an example. When the characteristic parameters of the current image matched to the data in the predetermined characteristic parameter table are polarities of "+−+−", the image is adjusted to be displayed in an inverted polarity manner of "++" "++−−" using the adjustment parameters, where "+" denotes a positive polarity, and "−" denotes a negative polarity. For details, refer to the description for the foregoing method embodiment. Details are omitted here.

The present disclosure further provides a display system including a liquid crystal touch screen and the above device for controlling in-plane interference of the liquid crystal touch screen. The device is connected to the liquid crystal touch screen, to control the in-plane interference of the liquid crystal touch screen.

Compared to existing display systems, a method and device for controlling in-plane interference of a liquid crystal touch screen and a display system provided by the present disclosure, by using a timing controller to detect a large ripple image on a display panel of the liquid crystal touch screen, and by inverting original polarities of data voltages input to at least a portion of data lines of the display panel, so that change directions of coupled voltages of adjacent two of the data lines with respect to a common electrode are opposite to each other, couplings to a common voltage cancel each other, and rippling while polarities of the data lines are inverted is significantly reduced. Therefore, touch screens (TPs) of liquid crystal touch screens would not generate explosion points, thereby solving problems that LCMs interfere with touch screens in-plane.

In summary, although the present disclosure has been described with preferred embodiments thereof above, it is not intended to be limited by the foregoing preferred embodiments. Persons skilled in the art can carry out many changes and modifications to the described embodiments without departing from the scope and the spirit of the present disclosure. Therefore, the protection scope of the present disclosure is in accordance with the scope defined by the claims.

What is claimed is:

1. A method for controlling in-plane interference of a liquid crystal touch screen comprising a display panel and a touch screen, the method comprising:

(S1) using a timing controller to detect a current image displayed by the display panel, and obtaining characteristic parameters of the current image;

(S2) matching the characteristic parameters to data in a predetermined characteristic parameter table, and if the characteristic parameters are same as the data in the predetermined characteristic parameter table, obtaining adjustment parameters corresponding to the data in the predetermined characteristic parameter table by the timing controller; and (S3) inverting original polarities of data voltages input to at least a portion of data lines of the display panel based on the adjustment parameters, so that change directions of coupled voltages of adjacent two of the data lines with respect to a common electrode are opposite to each other;

wherein before the step S1, the method further comprises:

(S101) obtaining predetermined characteristic parameters of the display panel when the display panel generates ripple interference to the touch screen;

(S102) creating the predetermined characteristic parameter table in a storage device of the timing controller; and (S103) creating, in the storage device of the timing controller, an adjustment parameter table corresponding to the data in the predetermined characteristic parameter table.

2. The method of claim 1, wherein data of the characteristic parameters and the data in the predetermined characteristic parameter table are polarities of data signals of the display panel.

3. The method of claim 1, wherein when the characteristic parameters of the current image matching the data in the predetermined characteristic parameter table are polarities of "+−+−", adjusting an image to be displayed in an inverted polarity manner of "+−−+" using the adjustment parameters.

4. The method of claim 3, wherein the display panel comprises n number of gate lines and m number of the data lines, wherein any column of sub-pixels is connected to adjacent two of the data lines in the m number of the data lines, and the column of sub-pixels are alternately connected to the two data lines;

a same row of sub-pixels are all connected to one of the gate lines in the n number of the gate lines, each sub-pixel of the same row of sub-pixels is located on a same side of each of the m number of the data lines, and each adjacent two rows of sub-pixels are correspondingly connected to two sides of each of the m number of the data lines; and a change direction of a coupled voltage of an m1th data line of the data lines with respect to the common electrode and a change direction of a coupled voltage of an m2th data line of the data lines with respect to the common electrode are opposite to each other, wherein m1 is an odd number and m2 is an even number.

* * * * *